(12) United States Patent
Pai

(10) Patent No.: US 7,411,750 B2
(45) Date of Patent: Aug. 12, 2008

(54) OPTICAL SIGHT

(75) Inventor: Shih-Yu Pai, Taichung (TW)

(73) Assignee: Asia Optical Co., Inc. (TW)

( * ) Notice: Subject to any disclaimer, the term of this patent is extended or adjusted under 35 U.S.C. 154(b) by 91 days.

(21) Appl. No.: 11/478,631

(22) Filed: Jul. 3, 2006

(65) Prior Publication Data

US 2008/0002266 A1    Jan. 3, 2008

(51) Int. Cl.
- *G02B 7/02*    (2006.01)
- *G02B 23/08*    (2006.01)
- *G02B 23/00*    (2006.01)

(52) U.S. Cl. .................. 359/822; 359/405; 359/429

(58) Field of Classification Search ................. 359/350, 359/353, 399–403, 405, 409–429, 806, 808–813, 359/815–825, 827–830; 42/119–123
See application file for complete search history.

(56) References Cited

U.S. PATENT DOCUMENTS

| | | | | |
|---|---|---|---|---|
| 2,949,816 A | * | 8/1960 | Weaver ...................... | 356/247 |
| 3,184,852 A | * | 5/1965 | Hageman ...................... | 33/298 |
| 3,510,192 A | * | 5/1970 | Maguire et al. ............. | 359/424 |
| 4,389,791 A | * | 6/1983 | Ackerman .................... | 42/122 |
| 4,584,776 A | * | 4/1986 | Shepherd ...................... | 42/122 |
| 4,998,811 A | * | 3/1991 | Basta .......................... | 359/422 |

* cited by examiner

*Primary Examiner*—Scott J. Sugarman
*Assistant Examiner*—Dawayne A Pinkney
(74) *Attorney, Agent, or Firm*—Banner & Witcoff, Ltd.

(57) ABSTRACT

An optical sight includes: an outer barrel having opposite ends; ocular and objective lens units mounted respectively to the ends of the outer barrel; a magnification unit disposed tiltably in the outer barrel, and extending between the ocular and objective lens units; an adjustment units mounted on the outer barrel, and operable independently and respectively to adjust position of the magnification unit inside the outer barrel in first and second directions that are perpendicular to each other; a biasing member interposed between the magnification unit and the outer barrel to provide an urging force on the magnification unit to abut against the adjustment units; and a force-adjusting unit disposed to connect the biasing member to the outer barrel, and operable to adjust the urging force exerted by the biasing member on the magnification unit.

7 Claims, 6 Drawing Sheets

OPTICAL SIGHT

BACKGROUND OF THE INVENTION

1. Field of the Invention

The invention relates to an optical sight, more particularly to an optical sight that facilitates reticle adjustment.

2. Description of the Related Art

As shown in FIG. 1 and FIG. 2, a conventional optical sight 1 includes an outer barrel 11, an ocular lens 12 mounted to one end 111 of the outer barrel 11, an objective lens 13 mounted to the other end 112 of the outer barrel 11, and a magnification unit 14 including an inner barrel 141 that is disposed tiltably in the outer barrel 11, and that extends between the ocular and objective lens units 12, 13. The conventional optical sight 1 further includes two adjustment units 16, and an elastic plate 17. The magnification unit 14 is provided with a reticle 15 visible through the ocular lens unit 12. The adjustment units 16 are mounted on the outer barrel 11. The elastic plate 17 is interposed between the inner and outer barrels 141, 11 to provide an urging force on the inner barrel 141 to abut against the adjustment units 16, and is disposed equiangularly from the adjustment units 16. Each of the adjustment units 16 includes a bolt 161 extending radially through and engaging threadedly the outer barrel 11, and abutting against the inner barrel 141, and a removable protective casing 162 for concealing the bolt 161.

When a user rotates the bolts 161 of the adjustment units 16 relative to the outer barrel 11, the bolts 161 respectively adjust position of the inner barrel 141 inside the outer barrel 11 in first and second directions (X1), (Y1) that are perpendicular to each other. The urging force exerted by the elastic plate 17 on the inner barrel 141 helps secure the inner barrel 141 in place after the adjustments has been made. In this manner, position of the reticle 15, which corresponds to aiming position of the optical sight, is adjusted. Although the elastic plate 17 is capable of exerting the urging force on the inner barrel 141, it has several drawbacks that require improvement during actual use.

Since the elastic plate 17 experiences fatigue after it has been in use for a period of time, the urging force exerted by the elastic plate 17 on the inner barrel 141 diminishes with time. Therefore, the position of the inner barrel 141 inside the outer barrel 11 often requires re-adjustments after the conventional optical sight 1, which is usually attached to a firearm (not shown), experiences recoil or intense vibration due to gunfire by the firearm. This re-adjustment of the position of the inner barrel 141 is inconvenient and troublesome.

Another type of conventional optical sight includes a fastening component (not shown) for securing the inner barrel 141 in place after the adjustment of the position of the inner barrel 141 in the outer barrel 11 by the adjustment units 16 is completed. Although the fastening component is capable of maintaining the position of the inner barrel 141 in the outer barrel 11, it is required to loosen the fastening component before each adjustment of the position of the inner barrel 141, and to tighten the fastening component after each adjustment is completed. The inconvenience aspect of the previous conventional optical sight 1 is obviously not improved with the use of the fastening component.

SUMMARY OF THE INVENTION

Therefore, the object of the present invention is to provide an optical sight that facilitates reticle adjustment.

According to the present invention, there is provided an optical sight that includes an outer barrel, ocular and objective lens units, a magnification unit, two adjustment units, a biasing member, and a force-adjusting unit. The outer barrel has opposite ends. The ocular lens unit is mounted to one of the ends of the outer barrel. The objective lens unit is mounted to the other one of the ends of the outer barrel. The magnification unit is disposed tiltably in the outer barrel, and extends between the ocular and objective lens units. The adjustment units are mounted on the outer barrel, and are operable independently and respectively to adjust position of the magnification unit inside the outer barrel in first and second directions that are perpendicular to each other. The biasing member is interposed between the magnification unit and the outer barrel to provide an urging force on the magnification unit to abut against the adjustment units. The force-adjusting unit is disposed to connect the biasing member to the outer barrel, and is operable to adjust the urging force exerted by the biasing member on the magnification unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
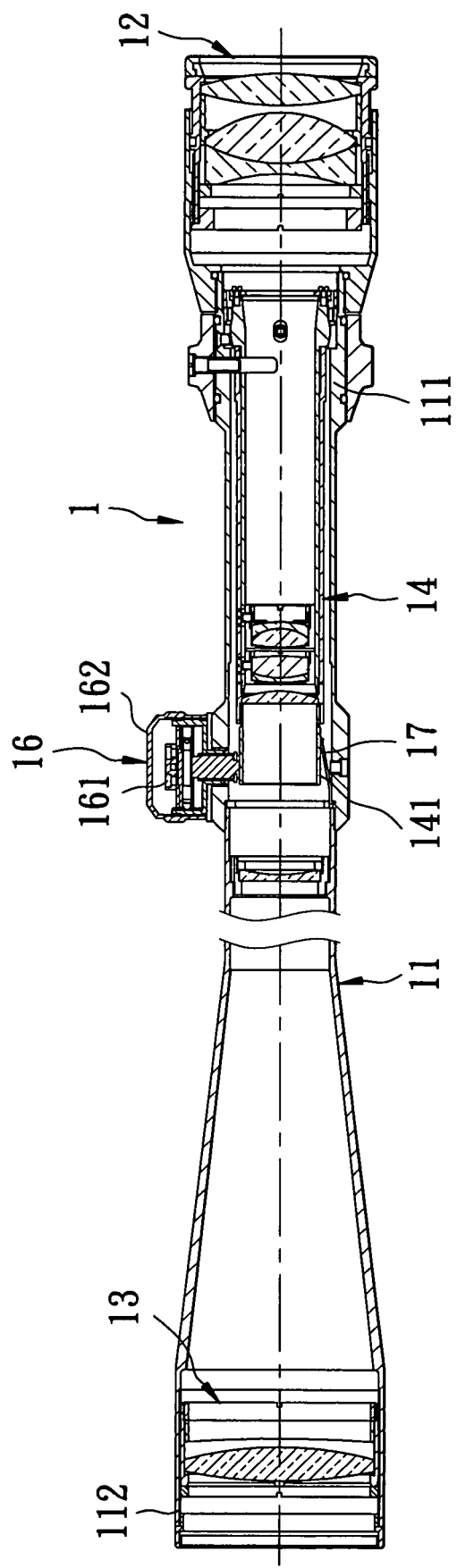
FIG. 1 is a sectional view of a conventional optical sight.
Figure 2:
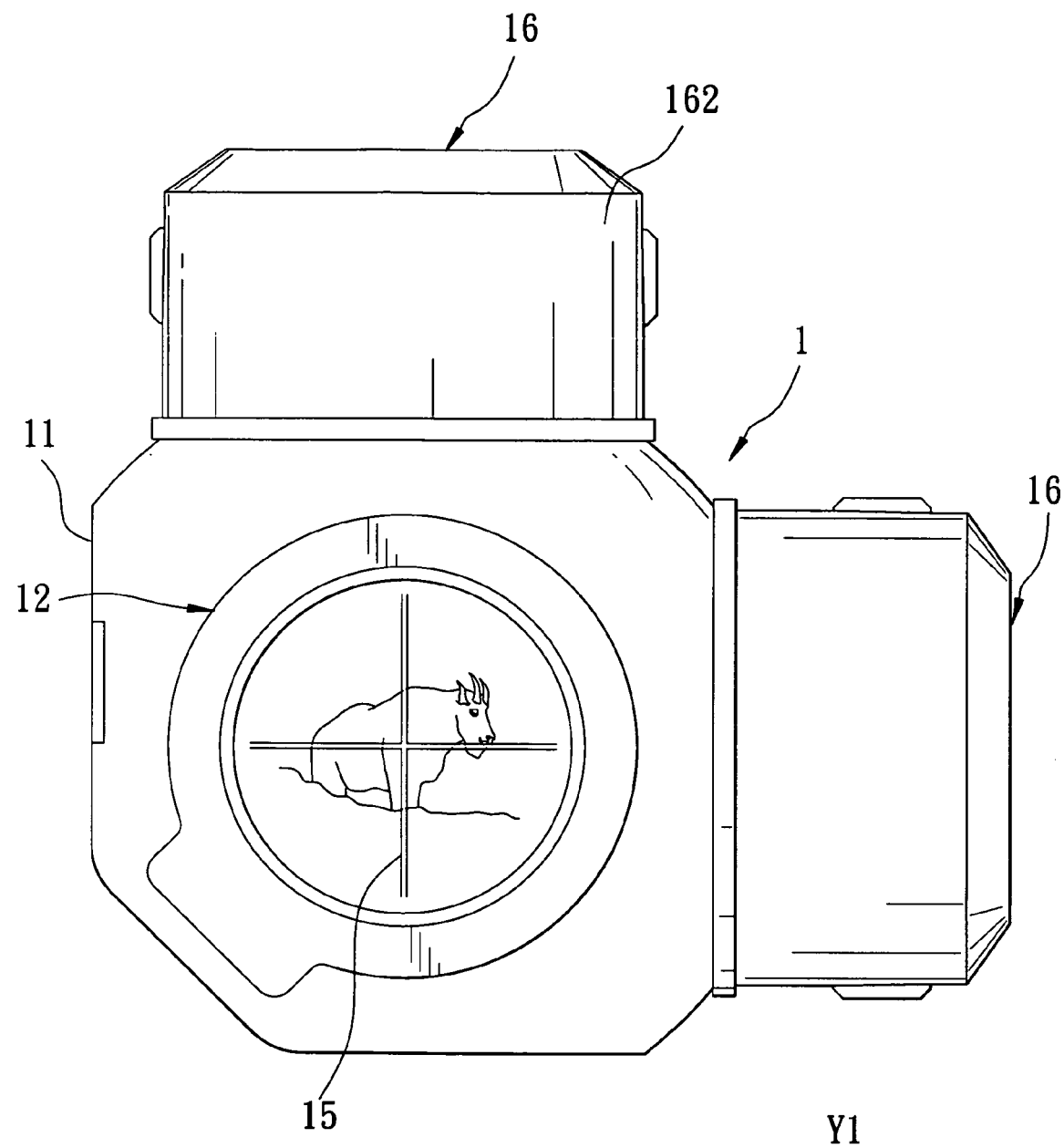
FIG. 2 is a side view of the conventional optical sight.
Figure 3:
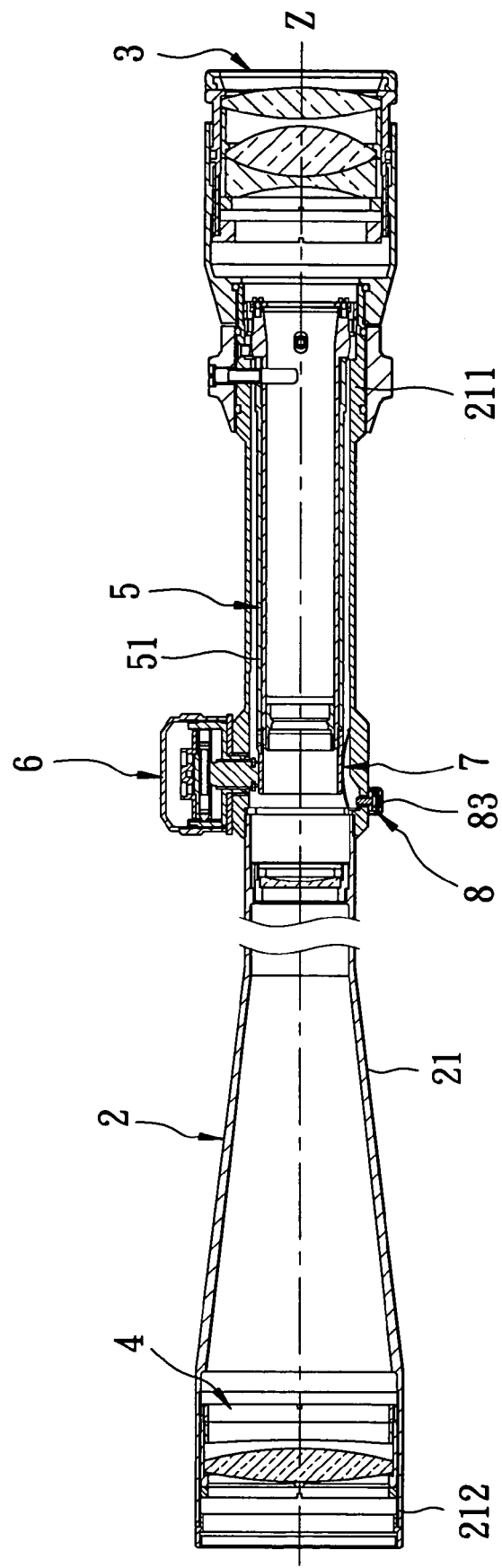
FIG. 3 is a sectional view of the preferred embodiment of an optical sight according to the present invention.

As shown in FIG. 3, the preferred embodiment of an optical sight according to the present invention includes an outer barrel 2, an ocular lens unit 3, an objective lens unit 4, a magnification unit 5, two adjustment units 6, a biasing member 7, and a force-adjusting unit 8.

The outer barrel 2 includes a barrel wall 21 that surrounds an axis (Z), and that has opposite first and second ends 211, 212.

The ocular lens unit 3 is mounted to the first end 211 of the barrel wall 21.

The objective lens unit 4 is mounted to the second end 212 of the barrel wall 21.

The magnification unit 5 includes an inner barrel 51 that is disposed tiltably in the outer barrel 2, and that extends between the ocular and objective lens units 3, 4. Since the feature of this invention does not reside in the coupling mechanism between the inner and outer barrels 51, 2, further details of the same are omitted herein for the sake of brevity.

Figure 4:
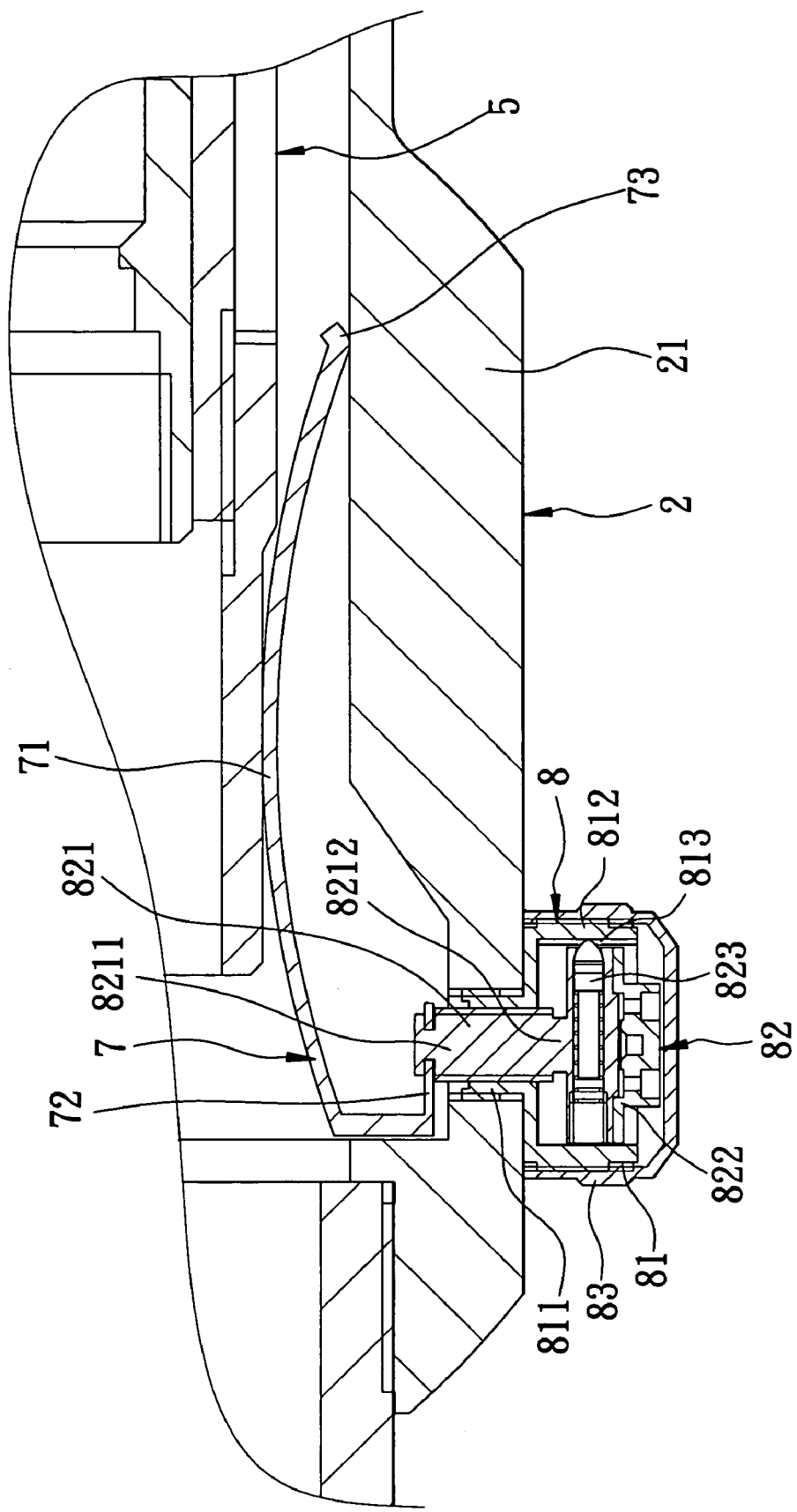
FIG. 4 is a fragmentary enlarged sectional view of the preferred embodiment, illustrating a biasing member and a force-adjusting unit.
Figure 5:
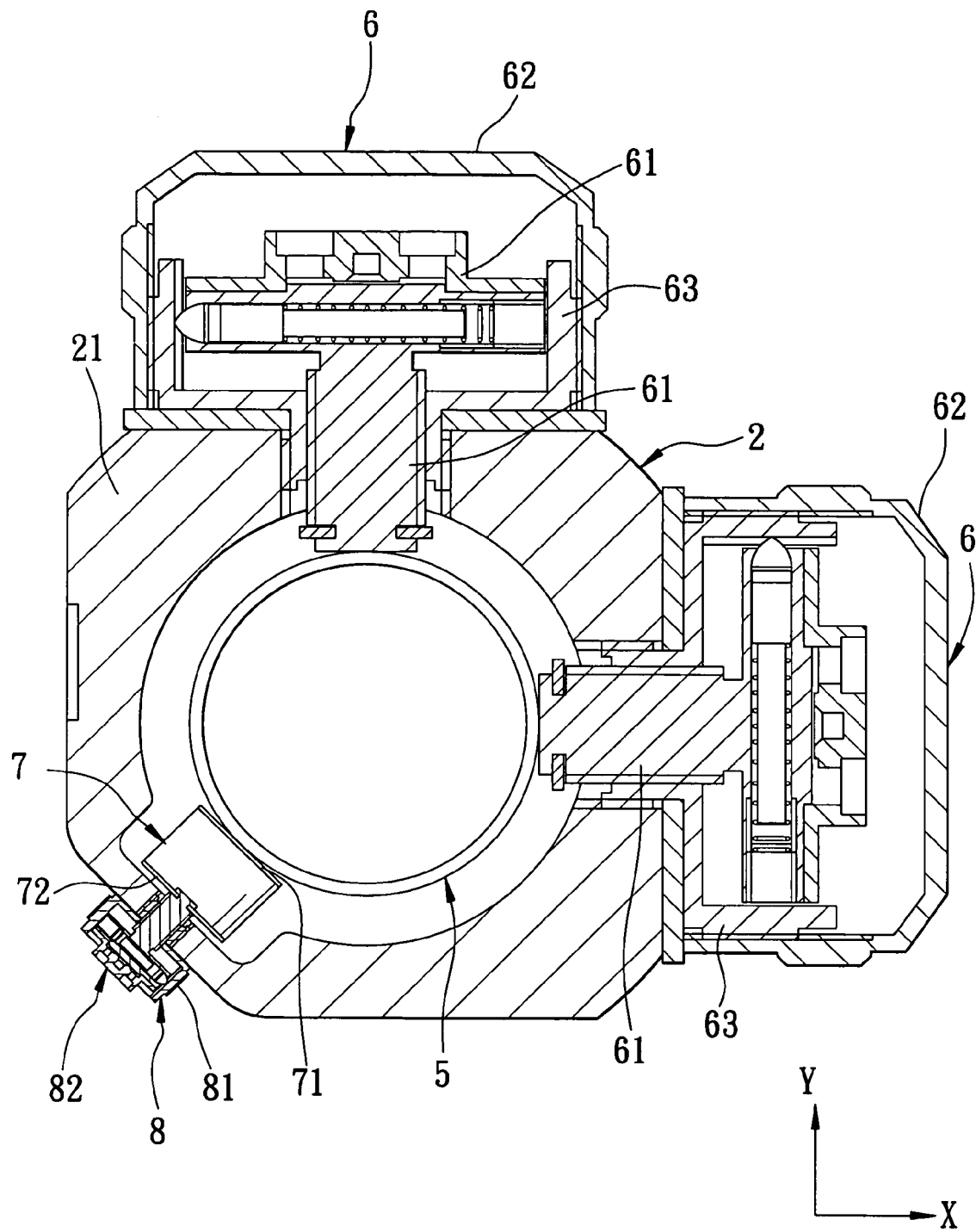
FIG. 5 is a sectional view of the preferred embodiment, illustrating correlations among adjustment units, the biasing member and the force-adjusting unit.

As shown in FIG. 4 and FIG. 5, the adjustment units 6 are mounted on the barrel wall 21, and are operable independently and respectively to adjust position of the inner barrel 51 inside the outer barrel 2 in first and second directions (X), (Y) that are perpendicular to each other. Each of the adjustment units 6 includes a fastener 61 extending radially through and engaging threadedly the barrel wall 21, and abutting against the inner barrel 51, and a removable protective cover 62 for concealing the fastener 61. Preferably, each of the adjustment units 6 further includes a support base 63 mounted to the barrel wall 21, engaging threadedly the fastener 61, and coupled removably to the protective cover 62.

The biasing member 7 is interposed between the inner and outer barrels 51, 2 to provide an urging force on the inner barrel 51 to abut against the adjustment units 6. The biasing member 7 is disposed equiangularly from the adjustment units 6.

The force-adjusting unit 8 is disposed to connect the biasing member 7 to the outer barrel 2, and is operable to adjust the urging force exerted by the biasing member 7 on the inner barrel 51.

In particular, the force-adjusting unit 8 includes a base 81 that is mounted radially to the barrel wall 21 of the outer barrel 2, and a bolt 82 that includes a bolt shaft 821 and a bolt head 822. The bolt shaft 821 extends through and engages threadedly the base 81, and has one end 8211 disposed in the outer barrel 2 and coupled to the biasing member 7 such that rotation of the bolt 82 relative to the base 81 results in adjustment of the urging force exerted by the biasing member 7 on the inner barrel 51. The bolt shaft 821 further has an opposite end 8212 connected to the bolt head 822 and disposed out of the outer barrel 2.

In this embodiment, the force-adjusting unit 8 further includes a protective casing 83 coupled removably to the base 81 so as to conceal the bolt 82. The base 81 includes a threaded portion 811 mounted to the barrel wall 21 and engaging threadedly the bolt shaft 821, and a surrounding portion 812 extending from the threaded portion 811 and surrounding the bolt head 822. Moreover, the surrounding portion 812 of the base 81 has a toothed inner surface 813. The bolt 82 further includes a spring-loaded pin 823 mounted in and projecting radially from the bolt head 822. The spring-loaded pin 823 engages the toothed inner surface 813 such that a sound is made when the bolt 82 is rotated relative to the base 81.

Figure 6:
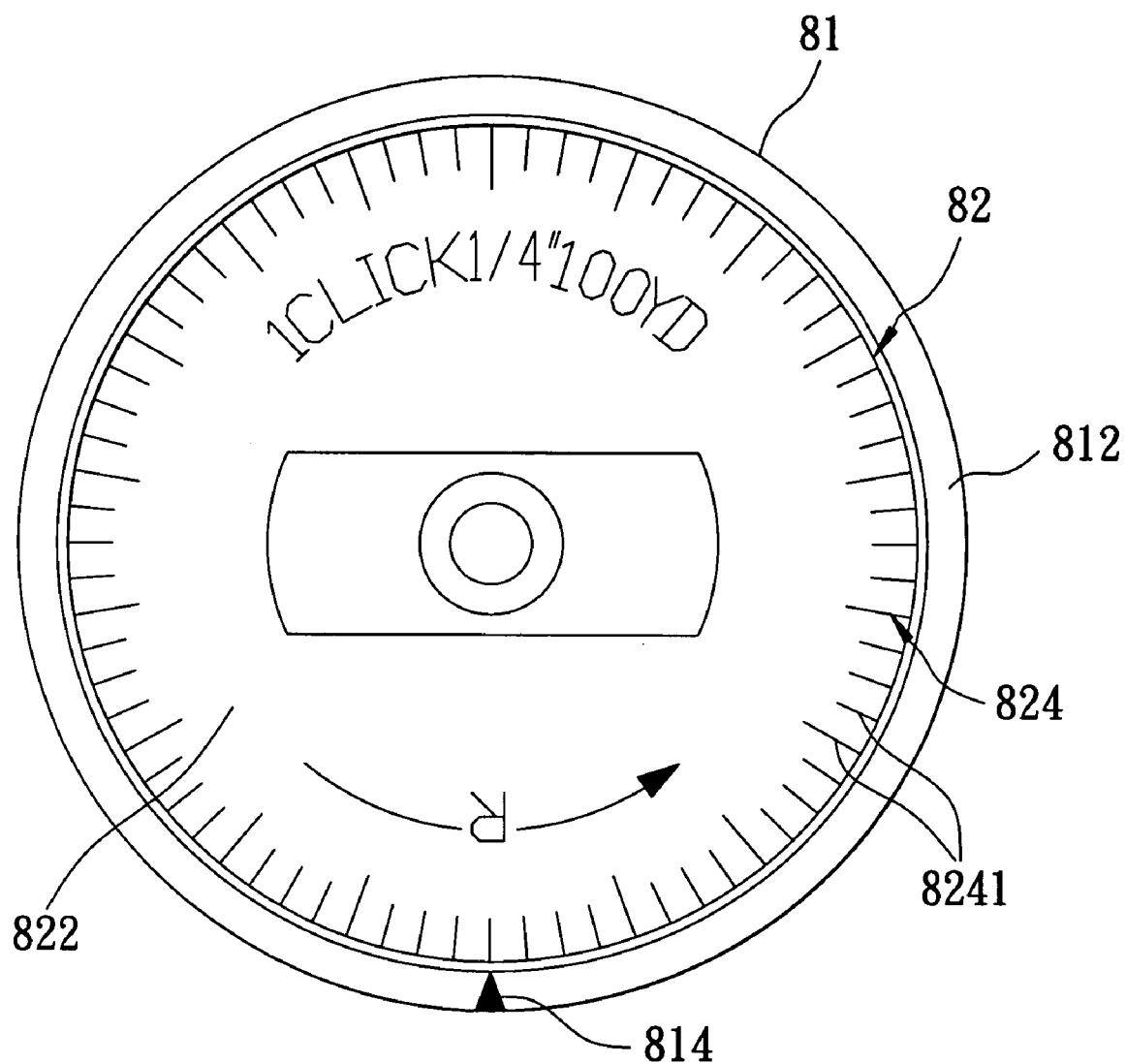
FIG. 6 is a schematic view of a marker and a scale of the force-adjusting unit according to the preferred embodiment.

As shown in FIG. 6, the base 81 further includes a marker 814 provided on one end face of the surrounding portion 812. The bolt 82 further includes a scale 824 provided on the bolt head 822, and having graduations 8241 to be aligned with the marker 814 in order to provide an indication of extend of angular rotation of the bolt 82 relative to the base 81.

Referring back to FIG. 4, in this embodiment, the biasing member 7 is an elastic plate, and includes an arch-shaped segment 71 biasing against the inner barrel 51, a connecting segment 72 extending from one end of the arch-shaped segment 71 and coupled to the one end 8211 of the bolt shaft 821, and an urging segment 73 extending from another end of the arch-shaped segment 71 and urging against the outer barrel 2.

As shown in FIG. 5, when a user (not shown) rotates the fasteners 61 with respect to the support bases 63, the fasteners 61 adjust position of the inner barrel 51 inside the outer barrel 2 in the first and second directions (X), (Y). The urging force exerted by the biasing member 7 on the inner barrel 51 helps maintain the position of the inner barrel 51 such that the inner barrel 51 constantly abuts against the fasteners 61. In this manner, the inner barrel 51 is secured upon adjustment of the aiming position of the optical sight.

As shown in FIG. 4, if the aiming position of the optical sight drifts due to vibrations or disturbances, the user is only required to rotate the bolt head 822 to drive the bolt shaft 821 to rotate relative to the base 81 so as to adjust the urging force exerted by the biasing member 7 on the inner barrel 51. In this manner, the fasteners 61 of the adjustment units 6 and the biasing member 7 provide three support points for securing the inner barrel 51 in place in the outer barrel 2 such that the aiming position of the optical sight can be ensured.

It should be noted herein that the urging force exerted by the biasing member 7 on the inner barrel 51 can be adjusted by adjusting depth of threaded engagement between the bolt 82 and the base 81.

As shown in FIG. 6, the marker 814 of the base 81 and the scale 824 of the bolt 82 cooperate to provide an indication to the user as to the extend of the angular rotation of the bolt 82 relative to the base 81. Amount of the urging force exerted by the biasing member 7 on the inner barrel 51 can thus be estimated accordingly. In addition, the sound made by the spring loaded pin 823 (shown in FIG. 4) and the toothed inner surface 813 alerts the user of the rotation of the bolt 82 relative to the base 81.

In sum, due to the presence of the biasing member 7, the position of the inner barrel 51 of the magnification unit 5 can be adjusted simply by operating the adjustment units 6, while the biasing member 7 helps maintain the position. More importantly, with the presence of the force-adjusting unit 8, the urging force provided by the biasing member 7 on the inner barrel 51 can be adjusted so as to ensure that the inner barrel 51 is maintained in its desired position after position adjustment. The optical sight according to the present invention is therefore convenient to use as compared to the prior art.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. An optical sight comprising:
   an outer barrel having opposite ends;
   an ocular lens unit mounted to one of said ends of said outer barrel;
   an objective lens unit mounted to the other one of said ends of said outer barrel;
   a magnification unit disposed tiltably in said outer barrel, and extending between said ocular and objective lens units;
   two adjustment units mounted on said outer barrel, and operable independently and respectively to adjust position of said magnification unit inside said outer barrel in first and second directions that are perpendicular to each other;
   a biasing member interposed between said magnification unit and said outer barrel to provide an urging force on said magnification unit to abut against said adjustment units; and
   a force-adjusting unit disposed to connect said biasing member to said outer barrel, and operable to adjust the urging force exerted by said biasing member on said inner barrel;
   wherein said outer barrel includes a barrel wall, said force-adjusting unit including a base that is mounted radially to said barrel wall, and a bolt that includes a bolt shaft and a bolt head, said bolt shaft extending through and engaging threadedly said base, and having one end disposed in said outer barrel and coupled to said biasing member such that rotation of said bolt relative to said base results in adjustment of the urging force exerted by said biasing member on said magnification unit, said bolt shaft further having an opposite end connected to said bolt head and disposed out of said outer barrel.

2. The optical sight as claimed in claim 1, wherein said biasing member is disposed equiangularly from said adjustment units.

3. The optical sight as claimed in claim 1, wherein said force-adjusting unit further includes a protective casing coupled removably to said base so as to conceal said bolt.

4. The optical sight as claimed in claim 1, wherein said base includes a threaded portion mounted to said barrel wall and engaging threadedly said bolt shaft, and a surrounding portion extending from said threaded portion and surrounding said bolt head.

5. The optical sight as claimed in claim 4, wherein said surrounding portion of said base has a toothed inner surface, said bolt further including a spring-loaded pin mounted in and projecting radially from said bolt head, said spring-loaded pin engaging said toothed inner surface such that a sound is made when said bolt is rotated relative to said base.

6. The optical sight as claimed in claim 4, wherein said base further includes a marker provided on one end face of said surrounding portion, said bolt further including a scale provided on said bolt head, and having graduations to be aligned with said marker.

7. The optical sight as claimed in claim 1, wherein said biasing member is an elastic plate, and includes an arch-shaped segment biasing against said magnification unit, a connecting segment extending from one end of said arch-shaped segment and coupled to said force-adjusting unit, and an urging segment extending from another end of said arch-shaped segment and urging against said outer barrel.

* * * * *